United States Patent
Dudar

(10) Patent No.: US 10,017,047 B2
(45) Date of Patent: Jul. 10, 2018

(54) METHOD AND SYSTEM FOR DIAGNOSING AN ACTIVE GRILL SHUTTER SYSTEM FAULT IN A HYBRID ELECTRIC VEHICLE

(71) Applicant: FORD GLOBAL TECHNOLOGIES, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/154,459

(22) Filed: May 13, 2016

(65) Prior Publication Data

US 2017/0326968 A1 Nov. 16, 2017

(51) Int. Cl.
| | | |
|---|---|---|
| *B60K 11/08* | (2006.01) | |
| *F01P 7/00* | (2006.01) | |
| *B60K 6/22* | (2007.10) | |
| *F01P 7/10* | (2006.01) | |

(52) U.S. Cl.
CPC ............. *B60K 11/085* (2013.01); *B60K 6/22* (2013.01); *B60Y 2306/05* (2013.01); *B60Y 2306/15* (2013.01); *F01P 7/10* (2013.01); *Y10S 903/904* (2013.01)

(58) Field of Classification Search
None
See application file for complete search history.

(56) References Cited

U.S. PATENT DOCUMENTS

| | | | | |
|---|---|---|---|---|
| 5,399,950 A * | 3/1995 | Lu | ............... | H02H 7/0851 318/434 |
| 8,692,662 B2 | 4/2014 | Shin et al. | | |
| 8,794,360 B2 * | 8/2014 | Nemoto | ............... | B60K 11/085 180/68.1 |
| 9,110,896 B2 | 8/2015 | Jeong et al. | | |
| 9,233,605 B2 | 1/2016 | Hijikata | | |
| 2013/0338870 A1 * | 12/2013 | Farmer | ............... | B60K 11/085 701/29.2 |
| 2014/0005897 A1 * | 1/2014 | Hayakawa | ........... | B60K 11/085 701/49 |
| 2014/0129078 A1 * | 5/2014 | Jeong | ..................... | G06F 11/30 701/32.8 |
| 2014/0295749 A1 * | 10/2014 | Hijikata | ............... | B60K 11/085 454/256 |
| 2014/0297081 A1 * | 10/2014 | Asami | ................... | B60L 3/0061 701/22 |
| 2014/0335778 A1 | 11/2014 | Takanaga et al. | | |
| 2015/0353077 A1 | 12/2015 | Asami et al. | | |
| 2016/0347303 A1 * | 12/2016 | Murata | .................. | B60K 6/445 |

FOREIGN PATENT DOCUMENTS

KR   20140026788   3/2014

OTHER PUBLICATIONS

English Machine Translation of KR20140026788A.

* cited by examiner

*Primary Examiner* — Kevin P Mahne
(74) *Attorney, Agent, or Firm* — Jason Rogers; King & Schickli, PLLC

(57) ABSTRACT

A method is provided for diagnosing an AGS system fault in a hybrid electric vehicle. That method includes validating shutter movement and inferring shutter position based upon stall current of a shutter drive motor and current drawn by an HEV traction motor. A new and improved active grill shutter system for a hybrid electric vehicle is also disclosed.

9 Claims, 4 Drawing Sheets

METHOD AND SYSTEM FOR DIAGNOSING AN ACTIVE GRILL SHUTTER SYSTEM FAULT IN A HYBRID ELECTRIC VEHICLE

TECHNICAL FIELD

This document relates generally to the motor vehicle equipment field and, more particularly, to a method and system for diagnosing an active grill shutter system fault in a hybrid electric vehicle.

BACKGROUND

Active grill shutters are being introduced in newer cars in order to meet stricter fuel economy standards. In operation, the active grill shutters are automatically closed to block air flow through the cooling system when cooling is not needed. In the closed position the active grill shutters help improve aerodynamics by reducing drag with the greatest benefit achieved at higher motor vehicle speeds. At other times, the active grill shutters are opened when necessary to reduce engine under hood temperatures. The active grill shutter (AGS) system is also used to control coolant temperatures, HVAC performance and exhaust emissions depending on the speed of the motor vehicle. During normal operation, the grill shutters are fully opened when the engine is off. When starting the engine from cold, the grill shutters are closed for as long as possible to help reach the most efficient engine operating temperatures more quickly. This helps reduce fuel consumption and emissions.

AGS systems typically incorporate an electronic control unit (ECU) or controller and AGS sensors such as Hall effect sensors which provide information with respect to the current position of the grill shutters back to the controller. Typically the AGS sensors are self-calibrating when the motor vehicle is first powered up.

There are many failure modes associated with an AGS system. The grill shutters could be stuck in position and the sensors could still be functional. The mechanical linkages for operating the grill shutters may become damaged over time. The DC shutter drive motor may function properly but without a load should the linkage break. Still further, the Hall effect sensors may become damaged or become contaminated from the environment in a manner that prevents their normal function. In this situation, the controller is not provided with data from the sensors that establishes the current position of the grill shutters.

While it is possible to infer that the grill shutters are in the closed position from a rising engine temperature, in cool climates that is not necessarily true. Also, in hybrid electric vehicles (HEVs), the vehicle may be driven in pure electric mode (EV mode) and the engine temperature may not change. Further, if the AGS system is stuck in the open position while driving in EV mode, there will be additional aerodynamic drag on the vehicle. Ideally, the AGS system should be closed when driving in EV mode when the combustion engine is cold and not operating. This document relates to a new and improved method and system that performs rationality testing of the AGS system to determine if the AGS sensors are rational and properly operating or if the grill shutters are mechanically stuck or not moving for this or any other reason such as a broken linkage. Advantageously, the novel method and system validate shutter movement and infer shutter position based upon (a) stall current of the shutter driver motor and (b) current drawn by the traction motor of the HEV.

SUMMARY

In accordance with the purposes and benefits described herein, a method is provided of diagnosing an AGS system fault in an HEV. That method comprises the validating of shutter movement and the inferring of shutter position based upon (a) stall current of a shutter drive motor and (b) current drawn by an HEV traction motor.

The method may further include the step of triggering an AGS diagnostic in response to a lack of AGS sensor data indicating shutter movement. Further, the method may include the step of monitoring, by a first sensor, electric current drawn by the shutter drive motor. In addition, the method may include the step of monitoring, by a second sensor, electric current drawn by the HEV traction motor.

Still further, the method may include the step of completing the AGS diagnostic during a steady state cruise of the HEV in EV mode. More specifically, the method may include (a) driving, by command of a controller, the shutter drive motor to a first limit position in a first direction at the stall current and (b) monitoring, by the second sensor, for any change in average current consumption of the HEV traction motor.

Still further, the method may include the steps of (a) driving, by command of the controller, the shutter drive motor to a second limit position in a second direction at the stall current and (b) monitoring by the second sensor for any change in average current consumption of the HEV traction motor whereby: (i) an increase in the average current consumption indicates movement of the shutters to an open position, (ii) a decrease in the average current consumption indicates movement of the shutters to a closed position, (iii) a change in the average current consumption indicates an AGS sensor fault and (iv) no change in the electric current drawn by the shutter drive motor indicates the shutters are stuck in position.

In accordance with still another aspect, a method is provided of controlling AGS operation in the event of an AGS sensor failure. That method comprises the steps of confirming an AGS sensor fault by means of the methods set forth above and inferring shutter position by driving, via command from the controller, the shutter drive motor to (a) the first limit position in the first direction at the stall current or (b) the second limit position in the second direction at the stall current wherein the first limit position corresponds to the shutter being fully closed and the second limit position corresponds to the shutters being fully opened.

In accordance with still another aspect, an AGS system is provided for an HEV. That AGS system may be described as comprising a plurality of shutters, a shutter drive motor for displacing the plurality of shutters between an opened position and a closed position, an AGS sensor for monitoring a current shutter position and a controller. That controller is configured to command operation of the shutter drive motor and initiate an AGS diagnostic in response to a lack of data received from the AGS sensor indicating shutter movement. In at least one possible embodiment, the AGS system further includes a first sensor for monitoring the electric current drawn by the shutter drive motor and a second sensor for monitoring the electric current drawn by the traction motor EHV.

Still further, the AGS system may include a controller configured to validate shutter movement and infer shutter position based upon (a) stall current of the shutter drive motor and (b) current drawn by the traction motor. Still further, the AGS system may include a controller configured to complete the AGS diagnostic during a steady state cruise of the HEV in EV mode. Further, the controller may be configured to drive the shutter drive motor to a first limit position in a first direction at the stall current and monitor, by data received from the second sensor, for any change in average current consumption of the traction motor.

Still further, the AGS system may include a controller that is further configured to drive the shutter drive motor to a second limit position in a second direction at the stall current and monitor, by data received from the second sensor, for any change in average current consumption of the traction motor. In such a system, an increase in the average current consumption indicates movement of the shutters to an open position. In contrast, a decrease in the average current consumption indicates movement of the shutters to a closed position. Further, any change in the average current consumption indicates an AGS sensor fault. Finally, no change in the electric current drawn by the shutter drive motor indicates the shutters are stuck in position.

Still further, the AGS system may include a controller that is further configured to confirm an AGS sensor fault and infer shutter position by driving the shutter drive motor to (a) the first limit position in the first direction at the stall current or (b) the second limit position in the second direction at the stall current when the first limit position corresponds to the shutters being fully closed and the second limit position corresponds to the shutters being fully opened.

In the following description, there are shown and described several preferred embodiments of the method and system. As it should be realized, the method and system are capable of other, different embodiments and their several details are capable of modification in various, obvious aspects all without departing from the method and system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method and system and together with the description serve to explain certain principles thereof. In the drawing figures.

Reference will now be made in detail to the present preferred embodiments of the method and system, examples of which are illustrated in the accompanying drawing figures.

DETAILED DESCRIPTION

Figure 1:
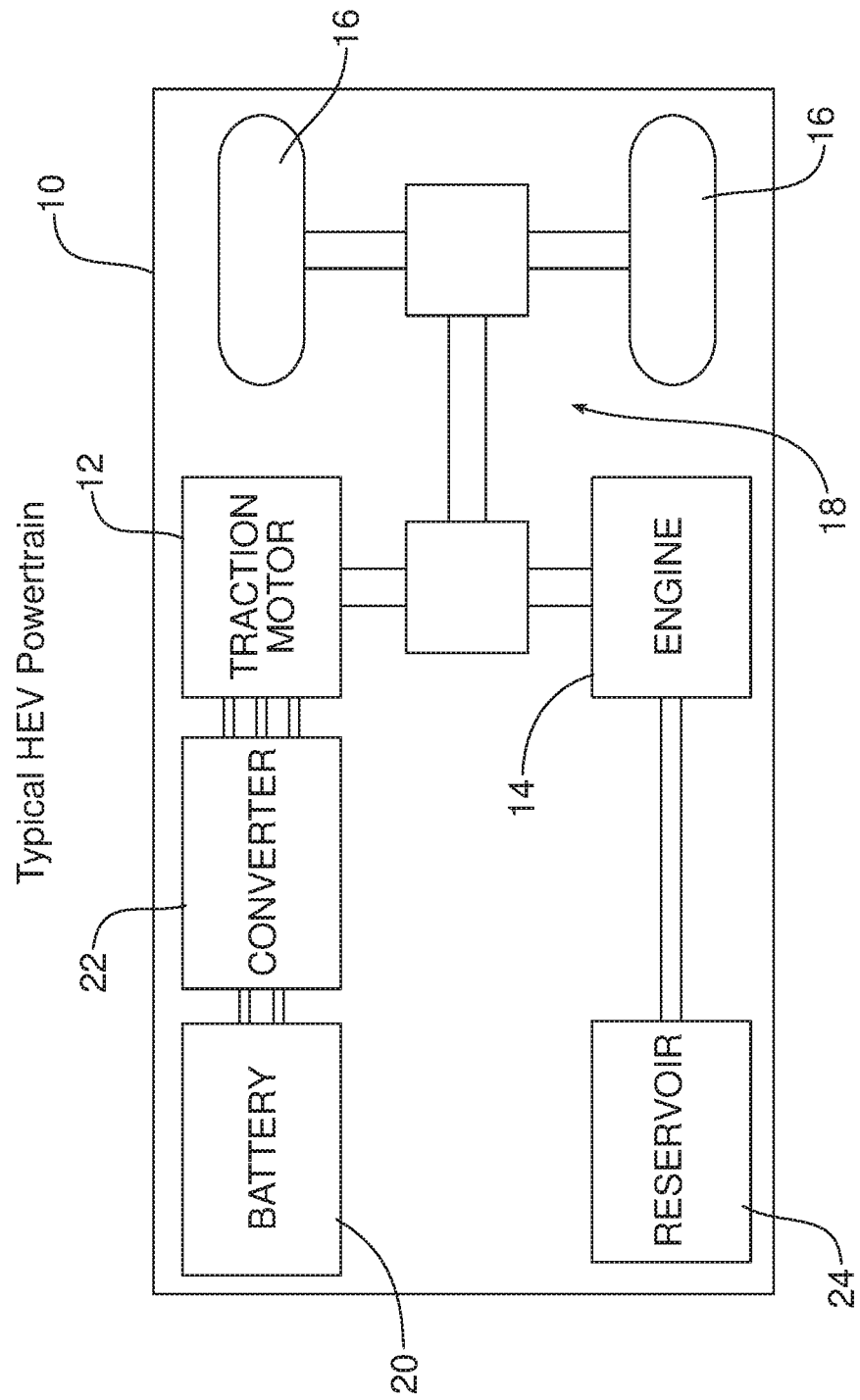
FIG. 1 is a schematic block diagram of an HEV vehicle power train.

Reference is now made to FIG. 1 which schematically illustrates a typical power train for a hybrid electric vehicle or HEV 10. As illustrated, the HEV 10 includes a traction motor 12 and an internal combustion engine 14 that are both adapted to drive the wheels 16 of the vehicle through the drive train generally designated by reference numeral 18. As shown, the traction motor 12 receives power from a battery 20 through a converter 22. In contrast, the internal combustion engine 14 receives a combustible fuel from the reservoir 24. Typically, the HEV 10 operates in one of three modes. In the electric or EV mode only the traction motor 12 is utilized to drive the wheels 16 through the drive train 18. In the hybrid mode, both the traction motor 12 and internal combustion engine 14 are utilized to power the wheels 16 through the drive train 18. In contrast, in the internal combustion mode, only the internal combustion engine 14 is utilized to drive the wheels 16 through the drive train 18.

Figure 2:
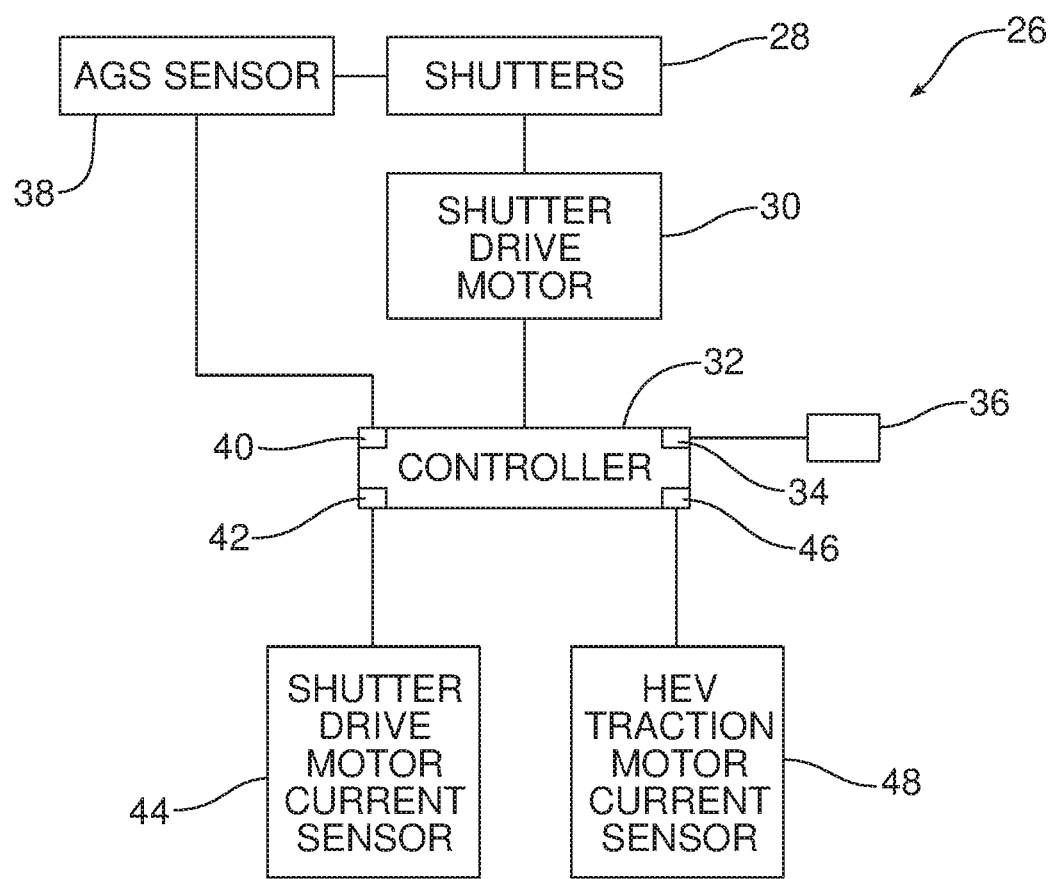
FIG. 2 is a schematic block diagram of the new and improved AGS system for an HEV.
Figure 3:
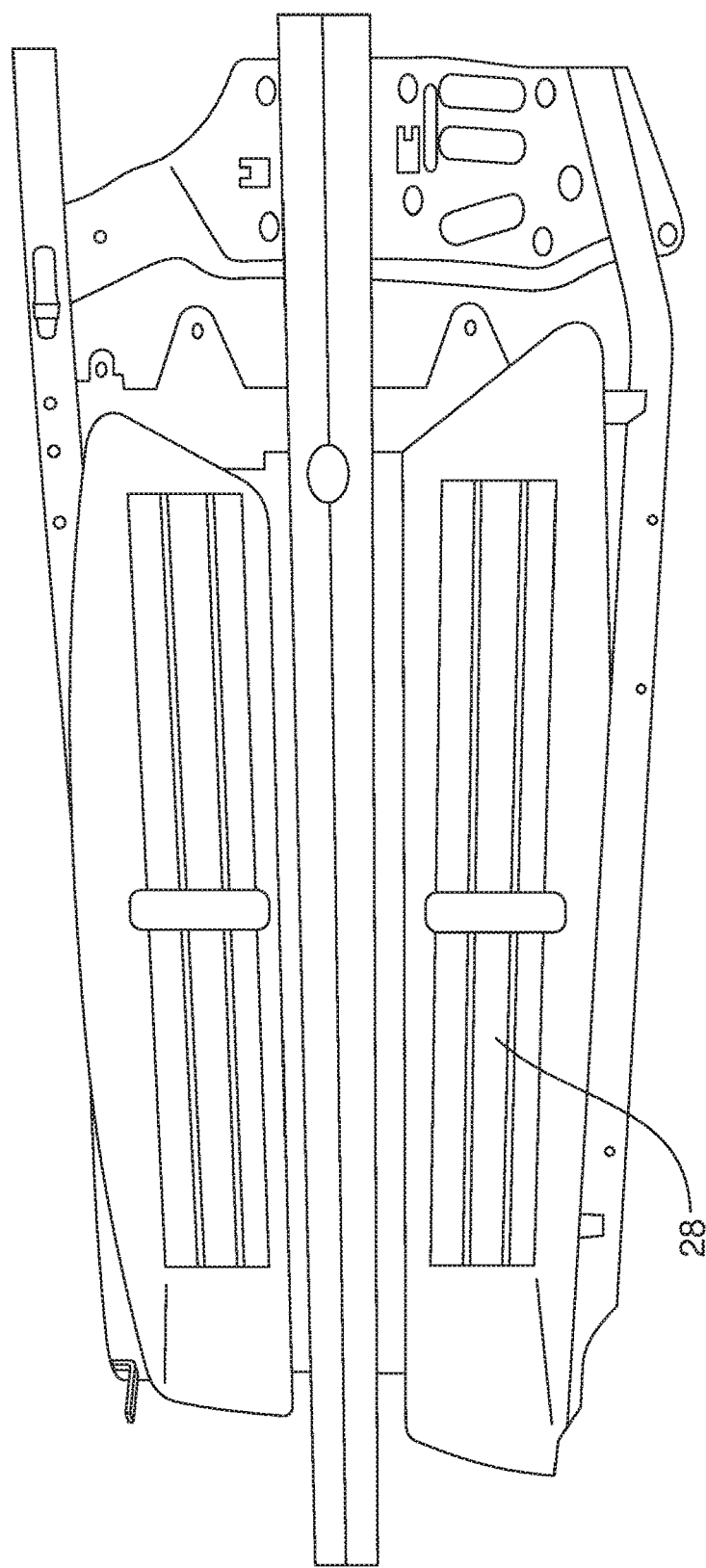
FIG. 3 is a perspective view of an AGS system illustrating the shutters in the closed position.
Figure 4:
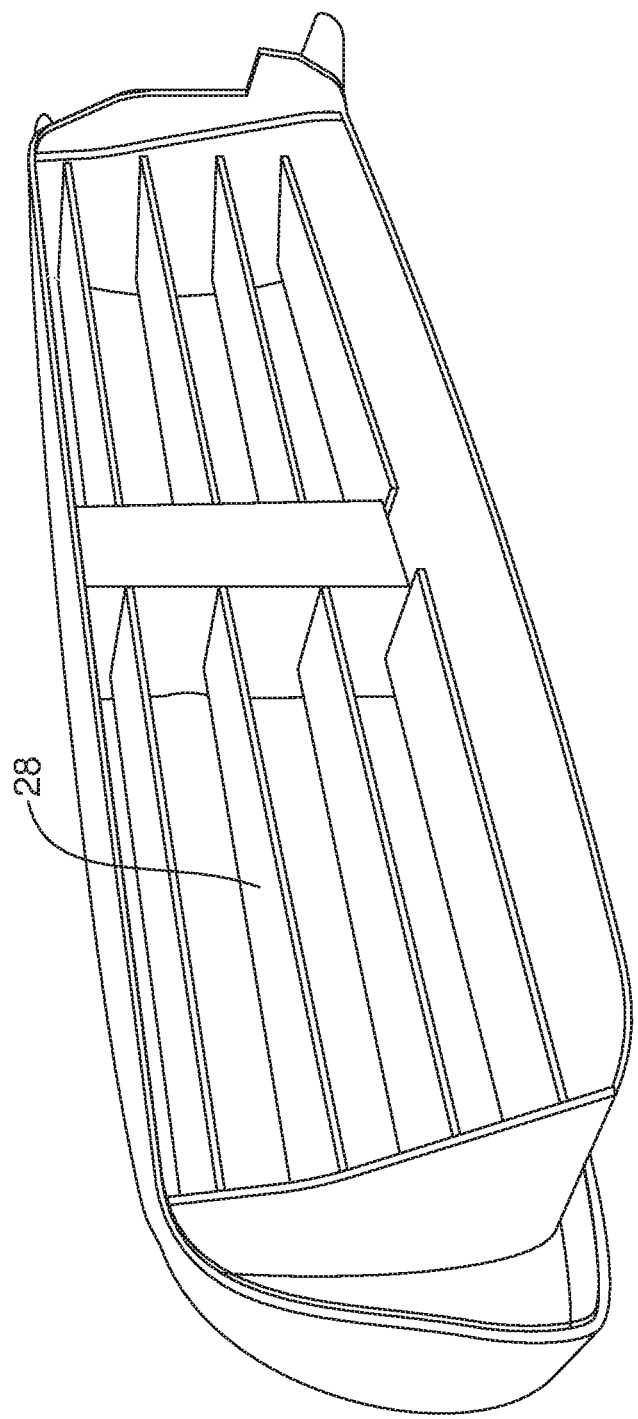
FIG. 4 is a perspective view of an AGS system illustrating the shutters in an opened position.

Reference is now made to FIGS. 2-4 illustrating the new and improved AGS system 26. That AGS system 26 includes a plurality of grill shutters 28 that may be displaced by an electric shutter drive motor 30 between a fully closed position illustrated in FIG. 3 and a fully opened position illustrated in FIG. 4. In the fully closed position, the grill shutters 28 shut off air flow through the under hood cooling module of the motor vehicle thereby increasing the aerodynamic efficiency of the vehicle. In contrast, in the fully opened position illustrated in FIG. 4, the grill shutters 28 allow air flow through the under hood cooling module as necessary in order to ensure the proper operation of the HEV 10.

More specifically, the AGS system 26 includes a controller 32 in the form of a computing device such as a dedicated microprocessor or electronic control unit (ECU) operating in accordance with instructions from appropriate software.

As illustrated, the controller 32 includes one or more data inputs 34 for receiving data from a plurality of sensors, detectors, monitors or other devices 36 such as other controllers wherein that data relates to such parameters as motor vehicle speed, internal combustion engine temperature, HVAC performance, coolant temperature, exhaust emissions and the like. An AGS sensor 38, such as a Hall effect sensor, provides feedback data to the controller 32 at the data input 40 establishing the current position of the grill shutters 28.

As further illustrated in FIG. 2, the controller 32 also includes a data input 42 connected to a shutter drive motor current sensor 44 or related control module or device which provides data respecting the current being drawn by the shutter drive motor 30. In addition, the controller 32 includes a data input 46 connected to an HEV traction motor current sensor or other device such as another controller or control module which provides data respecting the current being drawn by the traction motor 12.

As previously noted in the background section of this document, an AGS system 26 is subject to many different failure modes including modes involving the AGS sensor 38, the shutter drive motor 30 and the linkage between the shutter drive motor 30 and the shutters 28. Advantageously, the controller 32 is configured to diagnose any AGS system fault in an HEV 10 and even provide for proper operation of the shutters 28 if the AGS sensor 38 is suffering a fault condition.

Toward this end, the controller 32 is configured to command operation of the shutter drive motor 30 and initiate an AGS diagnostic in response to a failure to receive shutter movement data from the AGS sensor 38 at the data input 40. Further, the controller 32 may be configured to validate shutter movement and infer shutter position based upon stall current of the shutter drive motor 30 and current drawn by the traction motor 12 as indicated, respectively, by the sensors or devices 44, 48 at the data inputs 42, 46.

More specifically, the controller 32 is configured to complete the AGS diagnostic during a steady state cruise of the HEV 10 in EV mode where the HEV is only being powered by the traction motor 12. For best results, this is accomplished during a steady state highway cruise preferably at a constant speed on relatively flat roads.

Still more specifically, the controller 32 is configured to drive the shutter drive motor 30 to a first limit position in a first direction at the stall current and monitor, by data received from the sensor or device 48 at the data input 46 for any change in average current consumption of the traction motor 12. Further, the controller 32 is configured to then drive the shutter drive motor 30 to a second limit position in a second direction at the stall current and again monitor, by data received from the sensor device 48 at the data input 46, for any change in average current consumption of the traction motor 12. When this is done, an increase in the average current consumption indicates movement of the shutters 28 to an open position. A decrease in the average current consumption indicates movement of the shutters 28 to the closed position. At the same time, a change in the average current consumption indicates a fault with the AGS sensor 38. Further, no change in the electric current drawn by the shutter drive motor 30, as indicated by the sensor device 44 at the input 42, indicates that the shutters 28 are stuck in position for some reason such as a broken linkage between the drive motor and the shutters.

Still further, the controller 32 is configured to confirm any AGS sensor fault and infer shutter position by driving the shutter drive motor 30 to the first limit position in the first direction at the stall current or the second limit position in the second direction at the stall current. The first limit position corresponds to the shutters 28 being fully closed as illustrated in FIG. 3 and the second limit position corresponds to the shutters being fully opened as illustrated in FIG. 4.

Consistent with the above description, a method is provided for diagnosing an AGS system fault in an HEV 10. That method may be broadly described as including the steps of validating shutter movement and inferring shutter position based upon the stall current of a shutter drive motor 30 and the current drawn by the HEV traction motor 12.

The method includes the triggering of an AGS diagnostic in response to a lack of AGS sensor data indicating shutter movement. Further, the method includes monitoring, by a first device 44 the electric current drawn by the shutter drive motor 30 and the step of monitoring, by a second device 48, the electric current drawn by the HEV traction motor 12.

As previously indicated, the method also includes completing of the AGS diagnostic during a steady state cruise of the HEV 12 in EV mode.

More specifically, the method includes the steps of (a) driving, by command of the controller 32, the shutter drive motor 30 to a first limit position in a first direction at the stall current for the shutter drive motor and (b) monitoring, by the second device 48 for any change in average current consumption of the HEV traction motor 12. Any increase in the average current consumption indicates movement of the shutters 28 to an opened position. In contrast, any decrease in the average current consumption indicates movement of the shutters 28 to a closed position. Further, any change in the average current consumption indicates that the shutters are moving between open and closed positions and the AGS sensor is failing to detect that movement and therefore, has a fault. Further, no change in the electric current drawn by the shutter drive motor 30 indicates that the shutters 28 are stuck in position for some reason.

Next, the method includes the steps of driving, by command of the controller 32 the shutter drive motor 30 to a second limit position in a second position at the stall current and monitoring, by the second device 48, for any change in average current consumption of the HEV traction motor 12. Here again, an increase in the average current consumption indicates movement of the shutters 28 to an open position while a decrease in the average current consumption indicates movement of the shutters to a closed position. Again, any change in the average current consumption indicates shutter movement and, therefore, an AGS sensor fault. No change in the electric current drawn by the shutter drive motor 30 indicates that the shutters 28 are stuck in position for some reason.

Still further, a method is provided of controlling AGS operation in the event of an AGS sensor failure. That method comprises the steps of confirming an AGS sensor fault by means of the method set forth above. This is then followed by the step of inferring shutter position by driving, via command from the controller 32, the shutter drive motor 30 to (a) the first limit position in the first direction at the stall current or (b) the second limit position in the second direction at the stall current wherein the first limit position corresponds to the shutters 28 being in the fully closed position as illustrated in FIG. 3 while the second limit position corresponds to the shutters being in the fully open position as illustrated in FIG. 4.

The method and system 26 disclosed herein provide a number of benefits and advantages. First, they can diagnose if an AGS system fault lies in the AGS sensor 38 or if the shutters 28 are simply stuck for some other reason such as a broken linkage between the shutters and the shutter drive motor 30. It should be appreciated this data and indication may be utilized to more efficiently and effectively service the motor vehicle at the automobile dealership. In addition, the system 26 and method allow for proper operation of the shutters 28 even when the AGS sensor 38 is not performing properly and not providing feedback to the controller 32 respecting the current position of the shutters 28. Thus, the HEV 10 may still be operated at peak efficiency until the fault with the AGS sensor has been corrected.

The foregoing has been presented for purposes of illustration and description. It is not intended to be exhaustive or to limit the embodiments to the precise form disclosed. Obvious modifications and variations are possible in light of the above teachings. For example, when driving in mixed gasoline/electric mode and an increase in engine coolant temperature suggests the shutters 28 are stuck in a closed position, the controller 32 may be configured to invoke EV mode in order to execute the AGS system diagnostic described in this document. All such modifications and variations are within the scope of the appended claims when interpreted in accordance with the breadth to which they are fairly, legally and equitably entitled.

What is claimed:

1. A method for diagnosing an active grill shutter (AGS) system fault in a hybrid electric vehicle (HEV), comprising:
    validating shutter movement and inferring shutter position via a controller based upon (a) stall current of a shutter drive motor monitored by a first device and (b) electric current drawn by an HEV traction motor monitored by a second device;
    triggering an AGS diagnostic in response to a lack of AGS sensor data indicating shutter movement; and
    driving, by command of the controller, said shutter drive motor to a first limit position in a first direction at said stall current and (b) monitoring, by the second device, for any change in average current consumption of said HEV traction motor.

2. The method of claim 1, including completing said AGS diagnostic during a steady state cruise of said HEV in electric mode (EV mode).

3. The method of claim 2, further including (a) driving, by command of said controller, said shutter drive motor to a second limit position in a second direction at said stall current and (b) monitoring, by said second device, for any change in average current consumption of said HEV traction motor whereby (i) an increase in said average current consumption indicates movement of said shutters to an open position, (ii) a decrease in said average current consumption indicates movement of said shutters to a closed position, (iii) a change in said average current consumption indicates an AGS sensor fault and (iv) no change in said electric current drawn by said shutter drive motor indicates said shutters are stuck in position.

4. A method of controlling active grill shutter (AGS) operation in the event of an AGS sensor failure, comprising:
confirming an AGS sensor fault by means of the method set forth in claim 3; and
inferring shutter position by driving, via command from said controller, said shutter drive motor to (a) said first limit position in said first direction at said stall current or (b) said second limit position in said second direction at said stall current wherein said first limit position corresponds to said shutters being fully closed and said second limit position corresponds to said shutters being fully opened.

5. The method of claim 1, further including invoking motor vehicle operation in pure electric mode (EV mode) in order to execute a diagnostic of the AGS system in response to an increase in engine coolant temperature suggesting shutters stuck in a closed position.

6. A method of controlling AGS operation in event of an AGS sensor failure, comprising:
confirming an AGS sensor fault by means of the method set forth in claim 1; and
inferring shutter position by driving, via command from a controller, said shutter drive motor to (a) a first limit position in a first direction at said stall current or (b) a second limit position in a second direction at said stall current wherein said first limit position corresponds to said shutters being fully closed and said second limit position corresponds to said shutters being fully opened.

7. An active grill shutter (AGS) system for a hybrid electric vehicle (HEV), comprising:
a plurality of shutters;
a shutter drive motor for displacing said plurality of shutters between an opened position and a closed position;
an AGS sensor for monitoring a current shutter position;
a first device monitoring electric current drawn by said shutter drive motor and a second device monitoring electric current drawn by a traction motor of said HEV; and
a controller configured to (a) command operation of said shutter drive motor and initiate an AGS diagnostic in response to a lack of data received from said AGS sensor indicating shutter movement, (b) validate shutter movement and infer shutter position based upon (i) stall current of said shutter drive motor monitored by the first device and (ii) current drawn by said traction motor monitored by the second device, (c) complete said AGS diagnostic during a steady state cruise of said HEV in pure electric mode (EV mode), and (d) drive said shutter drive motor to a first limit position in a first direction at the stall current and monitor, by data received from said second device, for any change in average current consumption of said traction motor.

8. The AGS system of claim 7, wherein said controller is further configured to drive said shutter drive motor to a second limit position in a second direction at said stall current and monitor, by data received from said second device, for any change in average current consumption of said traction motor whereby (a) an increase in said average current consumption indicates movement of said shutters to an open position, (b) a decrease in said average current consumption indicates movement of said shutters to a closed position, (c) a change in average current consumption indicates an AGS sensor fault and (d) no change in said electric current drawn by said shutter drive motor indicates said shutters are stuck in position.

9. The AGS system of claim 8, wherein said controller is further configured to confirm an AGS sensor fault and infer shutter position by driving said shutter drive motor to (a) said first limit position in said first direction at said stall current or (b) said second limit position in said second direction at said stall current wherein said first limit position corresponds to said shutters being fully closed and said second limit position corresponds to said shutters being fully opened.

\* \* \* \* \*